United States Patent [19]
Kou

[11] Patent Number: 6,085,265
[45] Date of Patent: Jul. 4, 2000

[54] SYSTEM FOR HANDLING AN ASYNCHRONOUS INTERRUPT A UNIVERSAL SERIAL BUS DEVICE

[75] Inventor: James Tai-Ling Kou, Corona, Calif.

[73] Assignee: Toshiba America Information Systems, Inc., Irvine, Calif.

[21] Appl. No.: 09/004,835

[22] Filed: Jan. 9, 1998

[51] Int. Cl.[7] .............................. G06F 3/00; G06F 13/00
[52] U.S. Cl. .................. 710/63; 710/1; 709/301; 370/276; 714/1
[58] Field of Search .......................... 710/1, 8, 63, 260, 710/129, 126, 27, 266, 100; 709/301; 714/1; 370/465, 276; 361/683; 439/604

[56] References Cited

U.S. PATENT DOCUMENTS

| | | | |
|---|---|---|---|
| 5,291,609 | 3/1994 | Herz | 710/52 |
| 5,499,384 | 3/1996 | Lentz et al. | 710/1 |
| 5,566,346 | 10/1996 | Andert et al. | 710/8 |
| 5,615,404 | 3/1997 | Knoll et al. | 710/62 |
| 5,621,898 | 4/1997 | Wooten | 710/117 |
| 5,630,141 | 5/1997 | Ross et al. | 710/261 |
| 5,636,211 | 6/1997 | Newlin et al. | 370/465 |
| 5,649,129 | 7/1997 | Kowert | 710/129 |
| 5,664,126 | 9/1997 | Hirakawa et al. | 345/329 |
| 5,784,581 | 7/1998 | Hannah | 710/110 |
| 5,822,182 | 10/1998 | Scholder et al. | 361/683 |
| 5,831,597 | 11/1998 | West et al. | 345/163 |
| 5,845,151 | 12/1998 | Story et al. | 710/27 |
| 5,859,993 | 1/1999 | Snyder | 712/208 |

OTHER PUBLICATIONS

Internet Page: //www.microsoft.co.za/hwdev/pcfuture/wd-musb.HTM.
Intel Corporation/Microsoft Corporation: Advanced Power Management (APM) BIOS Interface Specification; Revision 1.2; Feb. 1996.
ComputerBoards, Inc.; PCI–GPIB; vol. 18, Sep. 1997.
Universal Serial Bus Specification; Revision 1.0, Jan. 15, 1996.
Universal Serial Bus (USB); Device Class Definition for Human Interface Deviuces (HID); Firmware Specification —Released Sep., 1996, Version 1.0 draft.

*Primary Examiner*—Gopal C. Ray
*Attorney, Agent, or Firm*—Pillsbury, Madison & Sutro LLP

[57] ABSTRACT

A system and method for establishing communication between a host computer and a peripheral device. The host computer includes logic for associating an attached peripheral device with one of a particular peripheral device type, logic for associating the attached peripheral device with an instance of a software driver executable on the processor, and logic for enabling communication between the attached device and the host after a set period of time after detection of the attachment of the USB device to the at least one port. The software driver is preferably capable of supporting communication between peripheral devices of the associated particular type and the host.

26 Claims, 10 Drawing Sheets

Microfiche Appendix Included
(2 Microfiche, 121 Pages)

SYSTEM FOR HANDLING AN ASYNCHRONOUS INTERRUPT A UNIVERSAL SERIAL BUS DEVICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

APPENDIX

This application includes a Microfiche Appendix which contains 2 sheets and 121 frames, containing a source code listing and data structures. This Appendix shows an example of a particular embodiment of the present invention incorporating features thereof which are described in detail below.

BACKGROUND

1. Field of the Invention

The described embodiments are directed to peripheral devices of a computer system. In particular, the described embodiments relate to methods and processes of communication between such peripheral devices and a host unit.

2. Related Art

Personal computer (PC) designs from the early 1980s have implemented peripheral devices according to a paradigm which assigns each peripheral device a specific interrupt line. In some cases a peripheral device is assigned a direct memory access (DMA) channel. IBM and other manufactures assigned these resources to particular peripheral devices which became the standard I/O locations, interrupt lines and DMA channels used by software developers to facilitate communication with a given peripheral device.

These standard PC peripheral interfaces (e.g., serial and parallel connections) support the standard attachment of a single device. Only one peripheral device can typically be attached at any time. Thus, adding a peripheral with new design to a computer system frequently requires a costly decision of adding a new expansion card that plugs into an expansion bus (e.g., ISA/EISA or PCI) to create an attachment point for the new device. Also, these early PC designs do not support "plug and play" attachment of devices. If a new peripheral device is to be attached while the operating system of the computer system is running, the user typically needs to re-boot the computer system after attaching the device so that the Basic Input/Output System (BIOS) configures the system to associate an interrupt line with the newly attached peripheral device.

The Universal Serial Bus (USB) design standard as described in the "Universal Serial Bus Specification" (Rev. 1.0, Jan. 15, 1996) published by Compaq, Digital Equipment Corp., IBM PC Co., Intel Corp., Microsoft Corp., NEC and Northern Telecom provides a new peripheral attachment standard to overcome the above described shortcomings of the earlier scheme. In the USB architecture, multiple peripheral devices may be coupled to a single USB controller. A corresponding software driver supported by the host operating system handles inputs from the USB controller. USB systems typically include a root hub coupled to a host controller for handling all communication between the host and USB devices through a root port. USB systems support additional hubs coupled to the root port to provide additional ports for receiving USB devices.

The USB architecture categorizes peripheral devices of a computer system (e.g., a personal computer system) by classes including audio devices, communications devices, display devices, Human Interface Devices (HIDs), mass storage devices, and others. The HID class includes devices that are manipulated by humans to control some facet of a computer's operations. Devices within this class may consist of the following types:

- keyboards and printing devices;
- front panel controls;
- controls associated with devices such as telephones (dialer), VCR remote controls, and game simulation devices; and
- devices that may not control the operation of a device, but provide data in a format similar to other HID devices.

The USB architecture defines a layered software scheme which includes, at the highest level, client drivers; at an intermediate level, USB system software; and at the lowest level, host controller software. Transactions performed over the USB are controlled by the client driver. The device (or hub client) may be class specific or vendor specific. Accordingly, each hub client requires a corresponding client driver which is tailored to the specific device class or device vendor. A client driver accesses its corresponding hub client by requesting an I/O transfer using an I/O request packet (IRP). System software allocates the necessary bandwidth for the transfer and directs the IRP to its destination hub client. The host controller software communicates with a USB host controller for the actual transmission of control and data information to and from the USB devices.

The USB architecture supports four modes of transferring data between the USB devices and the host. These types of transfers are categorized as follows: Interrupt Transfers, Bulk Transfers, Isochronous Transfers, and Control Transfers. An Interrupt Transfer is used for devices that are typically thought of as interrupt driven devices. Current USB designs typically call for periodically polling the USB devices which are interrupt driven to determine whether the device has data to transfer. Control Transfers typically send specific requests to USB devices from the host. Control Transfers are typically performed during device configuration. In a Control Transfer, a special transfer sequence is used to pass requests to a device, sometimes followed by data transfer, and concluded with a status completion indication.

A main objective of the USB architecture is to allow many types of devices to be coupled as peripherals. The host typically periodically polls devices coupled to the USB to determine the characteristics of this device. In response, the polled devices provide a number of "Descriptors" to the host software to identify its characteristics. These Descriptors include a "Device Descriptor," "Configuration Descriptor," "Interface Descriptor," and "Endpoint Descriptor." HID devices typically additionally have an "Entity Descriptor" as indicated in the "Universal Serial Bus (USB) Device Class Definition for Human Interface Devices (HID) (Version 1.0, September 1996) published by the USB Implementers' Forum.

While the USB standard provides a basic architecture which may overcome the shortcomings of the earlier systems for peripheral device attachment and communication, the USB standard does not provide significant details as to how to integrate the USB architecture into a current PC design. Thus, there is a need for developing cost effective and efficient methods for implementing the USB architecture to facilitate communication with the many types of peripheral devices which may be attached to a host computer through a USB.

SUMMARY

An object of an embodiment of the present invention is to provide a system of communication between a host computer and a peripheral device associated with the applications programs executing on the host computer.

Another object of an embodiment of the present invention is to provide an implementation of a Universal Serial Bus (USB) architecture which supports communication between a USB and a single USB device which includes a plurality of controls and displays.

Another object of an embodiment of the present invention is to provide software drivers executable on a processor of a host computer which facilitate communication between a peripheral device attached to a host computer and application programs executing on the processor of the host computer.

Briefly, an embodiment of the present invention is directed to a computer system including a host having a processor and at least one port capable of attaching to at least one peripheral device. The host includes logic for associating the attached peripheral device with one of a particular peripheral device type, logic for associating the attached peripheral device with an instance of a software driver executable on the processor, and logic for enabling communication between the attached peripheral device and the host upon a detecting a condition indicating reliable data transfer between the attached peripheral device and the host. The software driver is preferably tailored to supporting communication between peripheral devices of the associated particular type and the host.

Another embodiment of the present invention is directed to a computer system including a host having a processor, and being capable of attaching to at least one peripheral device through at least one port. The host includes logic for associating an attached peripheral device with an instance of a software driver executable on the processor to support communication between the attached peripheral device and the host, and logic for associating the instance of the software driver with at least one application program executing on the processor. The instance of the software driver is preferably responsive to calls from the at least one associated application program. The host also includes logic for maintaining the instance of the software driver while the at least one associated application is executing, independent of whether the peripheral device remains attached to the host. In this manner, the applications may terminate properly, independent of the attachment of the peripheral device to the host. The host also preferably includes logic for terminating the instance of the software driver when the execution of the at least one application program terminates. This may then free the memory resources occupied by the instance.

Another embodiment of the present invention is directed to a host computer system having a USB controller capable of attaching to a USB device through a port. The USB device includes a plurality of distinct controls for receiving user inputs. The host computer system includes logic for associating the USB device with exactly one Entity Descriptor and associating each of the plurality of controls with a distinct data structure. The host computer system further includes a memory for storing a data packet received in response to an associated Interrupt Transfer initiated at the USB device. The data packet includes data representative of a plurality of the data structures. Each of the plurality of data structures preferably correspond with an input from its associated control. The host computer system further includes logic for extracting each of the data structures from the stored data packet. In this manner, inputs from multiple controls on the USB device may be transmitted to applications executing on the host in a single Interrupt Transfer.

Yet another embodiment of the present invention is directed to a host computer system capable of attaching to a peripheral device through a port to receive data transfers, each data transfers having a data packet associated therewith. The host computer system preferably includes logic for enabling the receipt of data transfers from the peripheral device in response to an attachment of the peripheral device to the host computer, and circuitry for detecting an a data transfer at the port. The host computer system further includes logic for selectively storing the data packet of the detected data transfer in an allocatable memory when at least one of the host computer system is enabled to receive data transfers and sufficient memory is allocatable to store the data packet. Thus, applications executing on the host computer system may asynchronously receive inputs from the peripheral device.

DETAILED DESCRIPTION

An embodiment of the present invention is directed to a Universal Serial Bus (USB) system for facilitating communication between a host unit and an enhanced Human Interface Device (HID). This system includes a protocol for transferring the information from the enhanced HID to the host computer and logic at the host computer configured to receive and transmit information to and from the enhanced HID. Other embodiments include logic for implementing plug and play capabilities. This logic may be included in a client software driver for the enhanced HID, and enhancements to the system software.

According to an embodiment, the enhanced HID includes a number of different features which are preferably supported by either communication from the enhanced HID to the host computer or communication from the host computer to the enhanced HID. Such features supported by communication from the host computer to the enhanced HID may include, for example, an answering machine light and an LED or LCD display. Such feature supported by communication from the enhanced HID to the host computer may include, for example, a dial (e.g., a volume knob), a device for providing mouse-like inputs, buttons which provide a power or sleep-mode switch, and an infrared pointer for providing VCR-like commands (e.g., play, fast forward, reverse). Thus, the enhanced HID preferably communicates with the host unit through the USB bidirectionally to support its functions.

As discussed in greater detail below, the enhanced HID is preferably associated with an "Entity Descriptor" which supports the communication from the enhanced HID to the host computer. The Entity Descriptor preferably establishes "Input Reports" which are data structures defining the format of the data transmitted from the enhanced HID to the host computer. "Output Reports" preferably define the format of the data transmitted from the host computer to the enhanced HID. Thus, the host software preferably supports the bi-directional communication according the Input and Output Reports.

Once the client driver is configured to communicate with the enhanced HID, the enhanced HID can send Input Reports for the input features (e.g., buttons, dial, and infrared pointer) for inputs to the client driver. According to an embodiment, this is accomplished through the Interrupt Transfer method as discussed above. The client driver sends data in Output Reports to the enhanced HID to support the output features (e.g., answering machine light and display). This is preferably accomplished using the Control Transfer method of transferring data from the host to the enhanced HID as discussed above. Accordingly, a single physical USB device can provide, in effect, multiple virtual input and output devices (e.g., display, IR pointer, and dial) with a single USB port and device driver.

Figure 1:
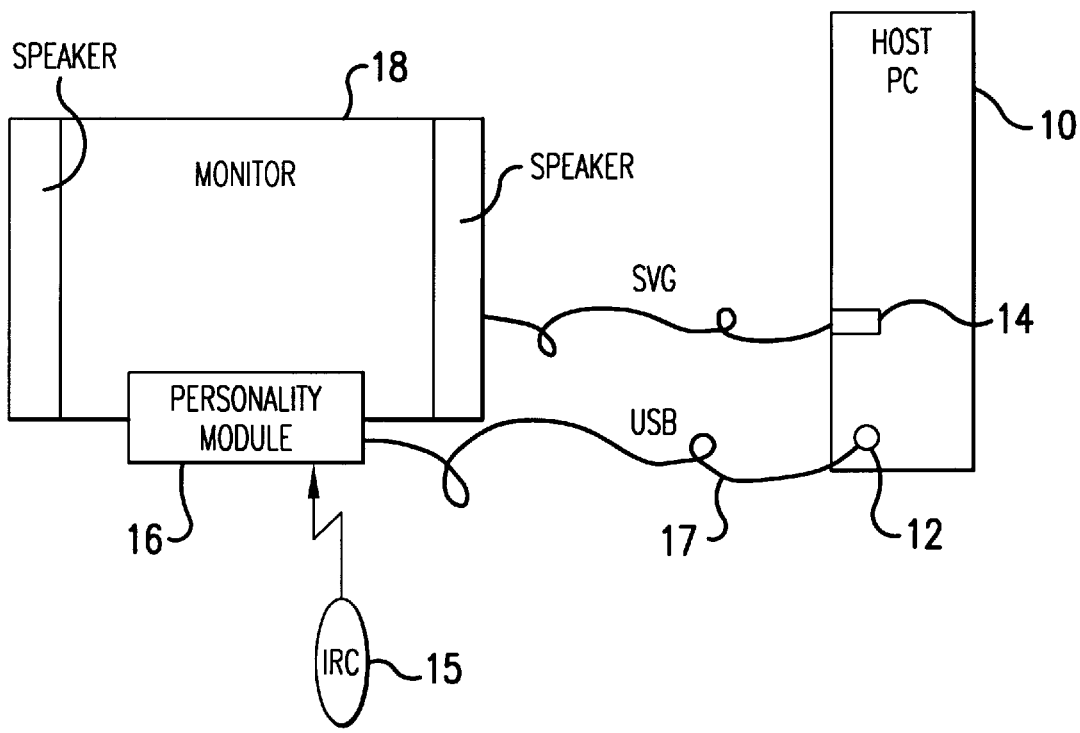
FIG. 1 shows a computer system which includes a Universal Serial Bus (USB) according to an embodiment.

FIG. 1 shows the computer system which includes a personal computer (PC) host 10, a display monitor 18 which is coupled to the PC host 10 through a display connection 14, and a Universal Serial Bus (USB) device 16 coupled to the personal computer host 10 through a USB root port 12. The personal computer host 10 also includes USB circuitry, including a USB host controller, (not shown) as described in the "Universal Serial Bus Specification" (Rev. 1.0, Jan. 15, 1996), which is published by Compaq, Digital Equipment Corp., IBM PC Company, Intel Corp., Microsoft Corp., NEC, and Northern Telecom, and is incorporated herein by reference. Alternatively, the USB device may be coupled to the USB root port 12 through an intermediary USB hub (not shown). The personal computer host 10 also includes a microprocessor system such as that of a Pentium® design, and sufficient random access memory (RAM) to support a Windows 95® or Windows NT® operating system. The personal computer host 10 also preferably hosts a Windows 95 or Windows NT operating system. Alternatively, other operating systems which support the USB architecture as specified in the "Universal Serial Bus Specification" and the "Universal Serial Bus Device Class Definition for Human Interface Devices (HID), (Version 1.0 Draft, September 1996) which is published by the USB Implementers Forum and is incorporated herein by reference.

Figure 2:
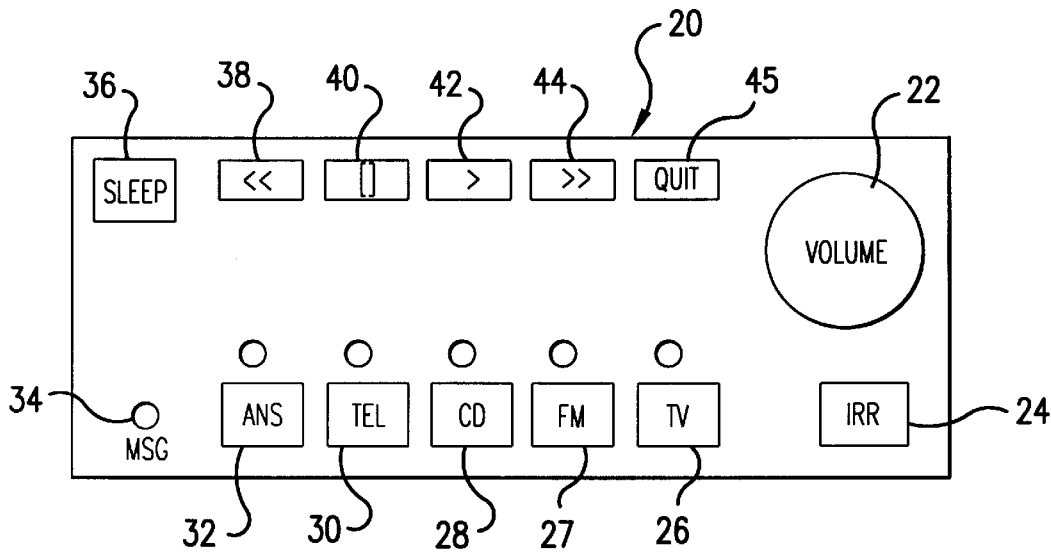
FIG. 2 shows a first embodiment of a control and display panel of the USB peripheral device of the embodiment of FIG. 1.
Figure 3:
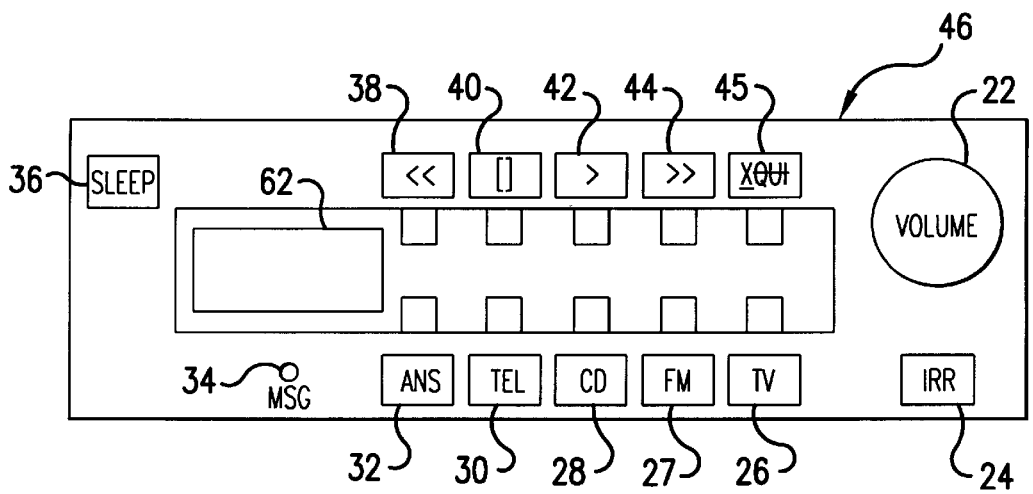
FIG. 3 shows a second embodiment of a control and display panel of the USB peripheral device of the embodiment of FIG. 1.

As shown in FIGS. 2 and 3, the USB device 16 is preferably of an HID class and includes various controls and displays which are enabled by bidirectional communication with the personal computer host 10 through the USB hardware and software implemented in the personal computer host 10. The USB device 16 also responds to inputs from an infrared controller (IRC) 15.

FIG. 2 shows a control panel 20 of the USB device 16 according to a first embodiment. The user may provide inputs to the USB device 16 by pressing one of several function selection buttons 26, 27, 28, 30, or 32 to select a particular function. Depending on the function selected, the user may also provide additional inputs by turning a volume knob 22, or pressing any of buttons 38, 40, 42, or 44, to initiate VCR-like commands. The user may also provide the same inputs through controls on the IRC 15 (FIG. 1) which initiates signals which are detected and received at an infrared receiver (IRR) 24. Each of the function selection buttons 26, 27, 28, 30, and 32 are associated with a small light located directly above the respective function selection button as shown in FIG. 2. Each of the lights, including an LED, for example, preferably indicate whether the associated function has been selected or unselected/deselected. Additionally, message light 34 preferably indicates to the user when a telephone message has been received when the personal computer host 10 including telephony hardware (not shown), has been configured to function as a telephone answering machine.

FIG. 3 shows a second embodiment of a control panel 46 of the USB device 16. The control panel 46 differs from the control panel 20 shown in FIG. 2 in that the control panel 46 includes an LCD display 62 which replaces the LEDs associated with each of the function selection buttons 26, 27, 28, 30, and 32. The LCD 62, in addition to showing the selection status of the function selection buttons, illuminates a status display with respect to the VCR-like functions selectable by the buttons 38, 40, 42, and 44. The LCD 62 may also provide other status information.

User inputs to the controls of control panels 20 and 46 are preferably provided to applications executing on the personal computer host 10 preferably through Interrupt Transfers to the USB host controller. Additionally, applications executing on the personal computer host 10 provide status information to be displayed on the displays (i.e., the status of message light 34 and LEDs associated with function selection buttons 26, 27, 28, 30, and 32, and information to be displayed on the LCD 62) via Control Transfers through the USB host controller.

Figure 4:
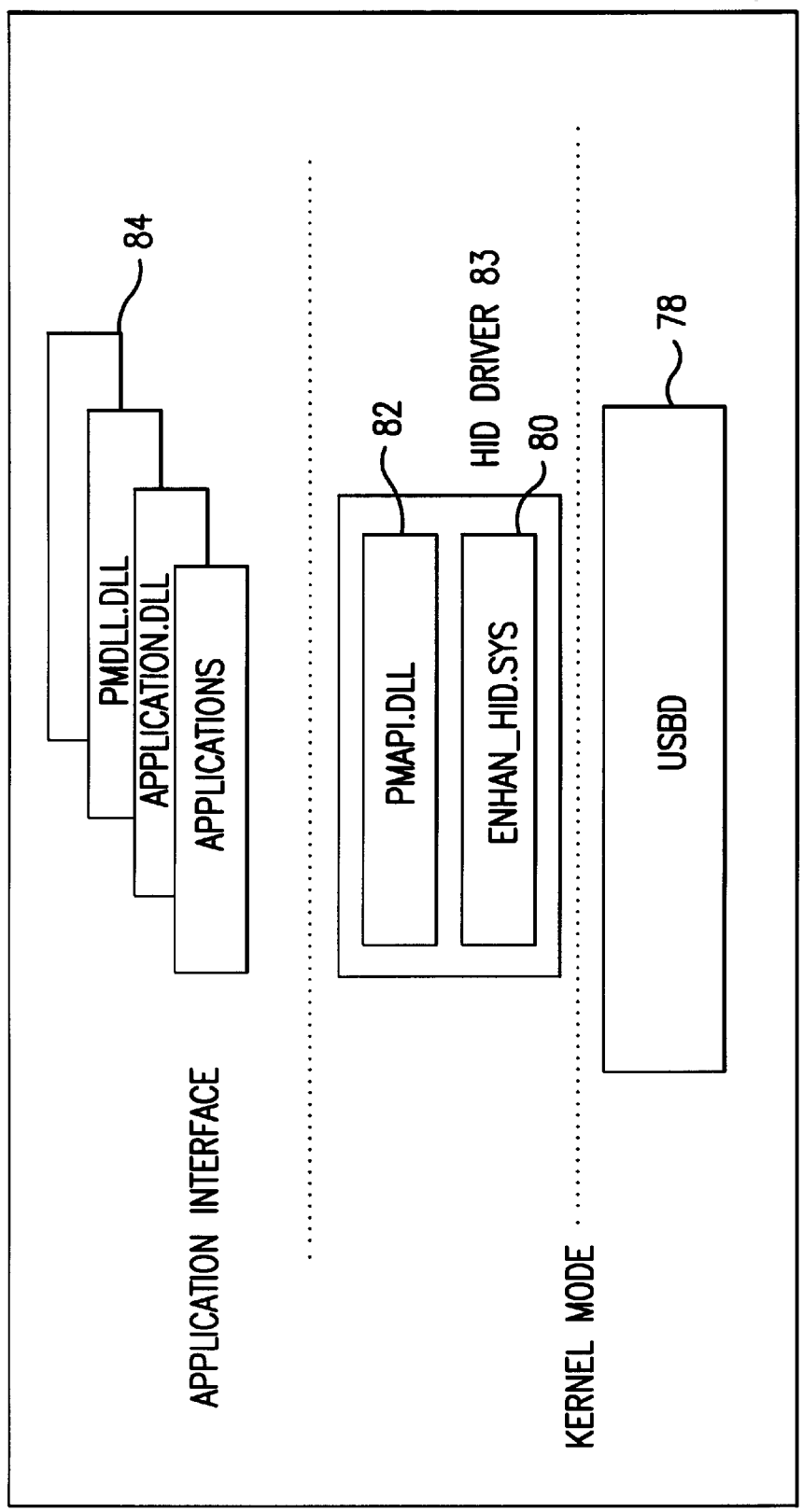
FIG. 4 shows an embodiment of the software layers executing on a processor of the computer system of FIG. 1 for facilitating communication with a USB peripheral device.

FIG. 4 shows layers of software executing on the microprocessor system of the personal computer host 10 to support the interaction between applications programs 84 and the USB device 16 through the USB. A USB driver 78 (USBD) preferably executes at a higher privilege level than applications programs 84. A human interface device (HID) driver 83 preferably executes at a privilege higher than that of the applications programs 84 but no higher than that of the USBD 78. According to an embodiment, USBD 78 program is provided as part of a Windows 95 or Windows NT operating system, or as a compatible addition to one of these operating systems. Accordingly, the HID driver 83 may communicate with the USB through a USB driver interface (USBDI) which has been established by Microsoft Corp. in its WDM USB Driver Interface.

The HID driver 83 includes two modules, the PMAPI.DLL module 82 and the Enhan_HID.SYS module 80. The PMAPI.DLL module 82 in a Win32 scheme, is preferably an applications program interface (API) dynamic-link library (DLL) which exports callable functions to the applications programs 84. Accordingly the PMAPI.DLL 82 functions preferably support Win32 based applications. Thus, to send status information to the USB device 16 in a Control Transfer, or to receive data from an interrupt transfer initiated at the USB device 16, one of the applications programs 84 preferably makes a call to one or more functions in the PMAPI.DLL module 82.

The Enhan_HID.SYS module 80 performs several lower level functions. The Enhan_HID.SYS module 80 processes input/output request packets (IRPs) directed to the USB device 16 from either a function in the PMAPI.DLL module 82 or the operating system. The Enhan_HID.SYS module 80 also processes Interrupt Transfers initiating at the USB device 16 through the USBD 78. Additionally, the Enhan_ HID.SYS module 80 controls the initiation and termination of processes in support of the plug and play functionality of the USB device 16.

As indicated by the function selection buttons 26, 27, 28, 30, and 32, on the control panel of the USB device 16 (FIGS. 2 and 3), the USB device 16 provides the user with a simple, convenient, and centralized control of the personal computer host 10 when functioning as a television, an FM radio, a CD/DVD player, a telephone, or a telephone answering machine. Accordingly, the applications programs 84 correspond with the applications programs, used in conjunction with relative hardware devices, which enable the personal computer host 10 to perform these selectable functions as is understood by those of ordinary skill in the art.

A USB device is generally characterized by several "Descriptors" including a "Device Descriptor," one or more "Configuration Descriptors," one or more "Interface Descriptors" associated with each Configuration Descriptor, one or more "Endpoint Descriptors" associated with each Interface Descriptor as discussed in detail in the Universal Serial Bus Specification (Revision 1.0) incorporated herein by reference above. Specific USB devices classified as Human Interface Devices (HID) may be associated with additional descriptors including a "HID Descriptor" associated with an Interface Descriptor, and one or more "Entity Descriptors" associated with the HID Descriptor a discussed in detail in the Universal Serial Bus device Class Definition for Human Interface Devices (Version 1.0) incorporated by reference above. According to an embodiment, the USB device 16 is classified as an HID USB device which is associated with one Device Descriptor, one Configuration Descriptor, one Interface Descriptor, one Endpoint Descriptor, one HID Descriptor, and one Entity Descriptor.

According to an embodiment, upon detection of an attachment of the USB device 16 to the root port 12, or the port of an intermediary hub, the USB interrogates the USB device 16 using a Control Transfer to obtain the associated Device Descriptor, Configuration Descriptor, Interface Descriptor, Endpoint Descriptor, and HID Descriptor. The Entity Descriptor defines one or more "Input Reports" which provide inputs to the applications programs 84 in response to user inputs at the USB device 16. Such Input Reports are preferably included in a serial data packet which is associated with an Interrupt Transfer received at the USB host controller. As discuss in greater detail below, this serial data packet is to be written to a buffer location in memory upon certain conditions to be later retrieved by the applications programs 84, through the HID driver 83.

As discussed above, the applications programs 84 from time to time send data to the USB device 16 to change the displays to inform the user of the status of various selected functions. Thus, a set of "Output Reports," are sent from the applications programs 84 to the USB device 16 using Control Transfers.

Figure 5:
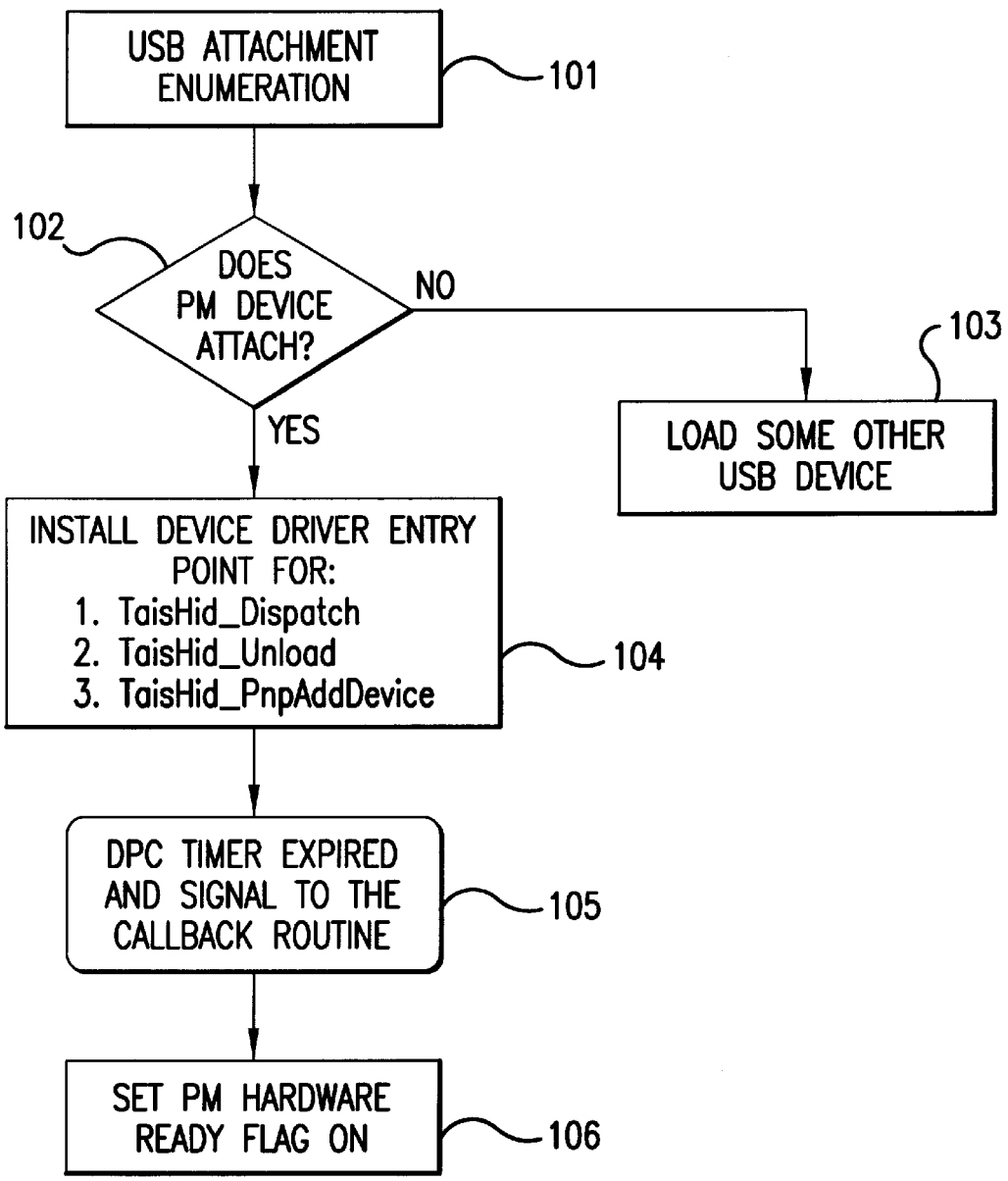
FIG. 5 shows a functional flow diagram of an embodiment of the device driver initialization process of the HID software driver of FIG. 4.
Figure 6A:
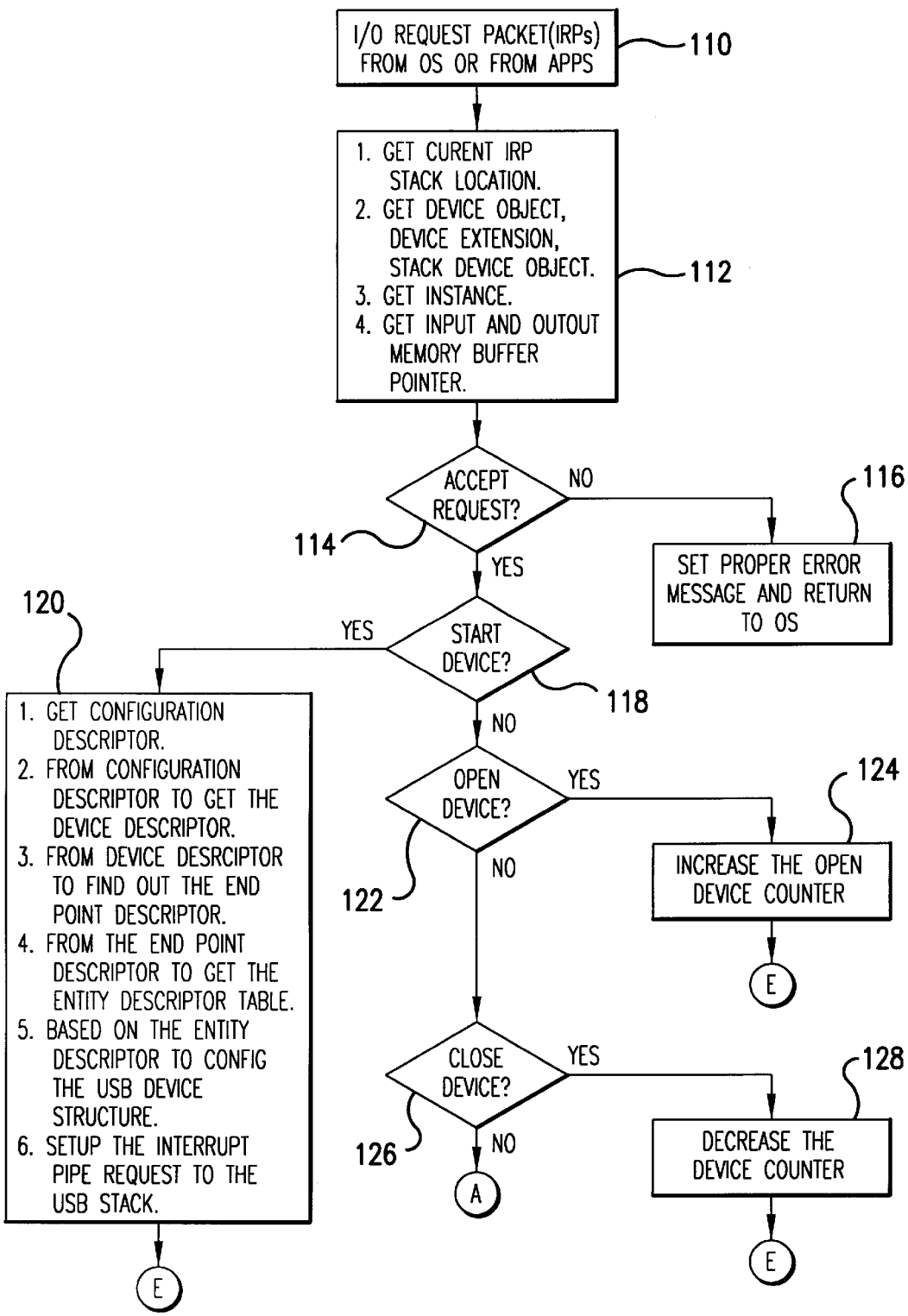
FIGS. 6a through 6d show a functional flow diagram of an embodiment of the process for handling an input/output request packet at the HID software driver of FIG. 4.
Figure 6B:
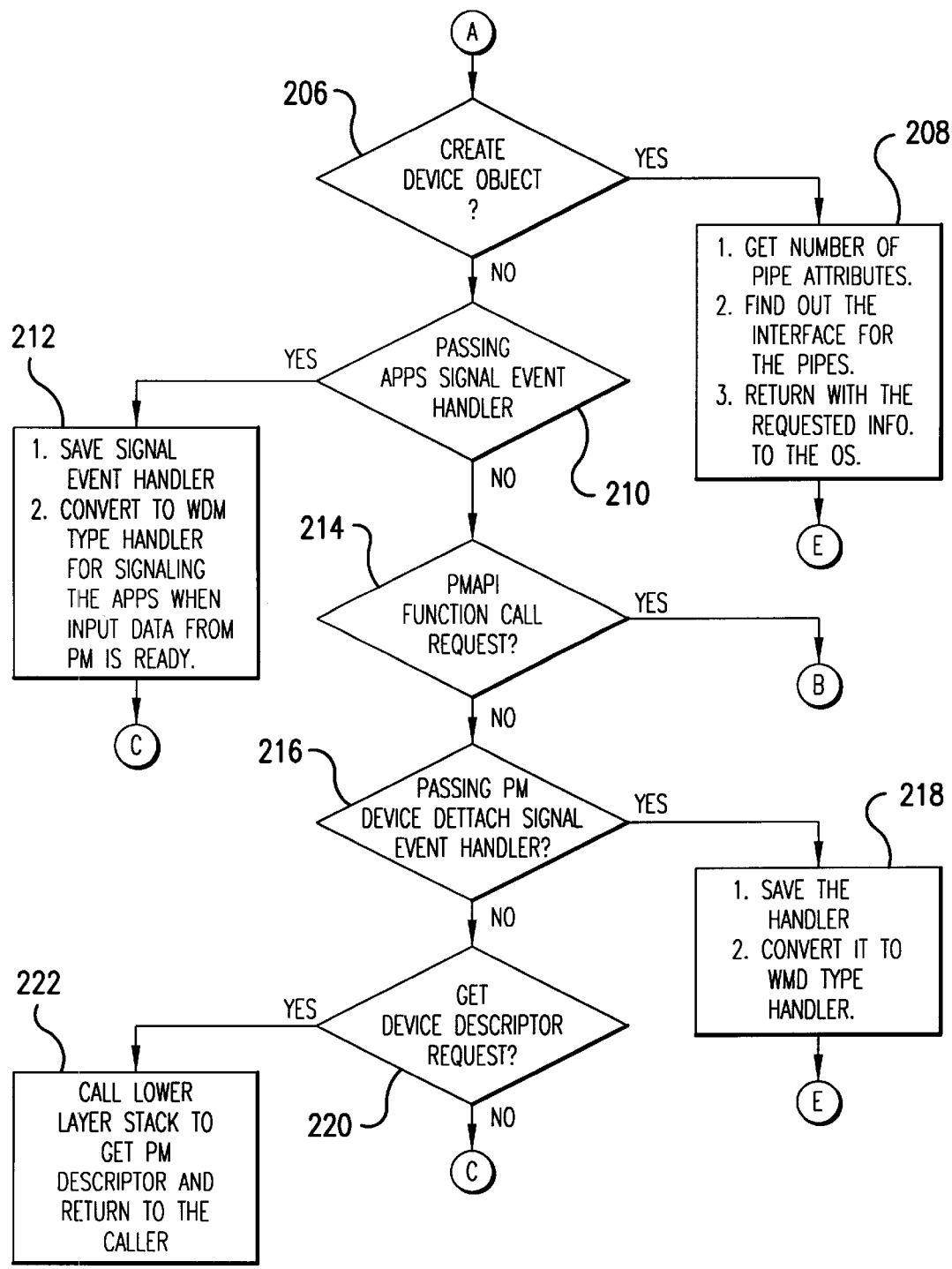
Figure 6C:
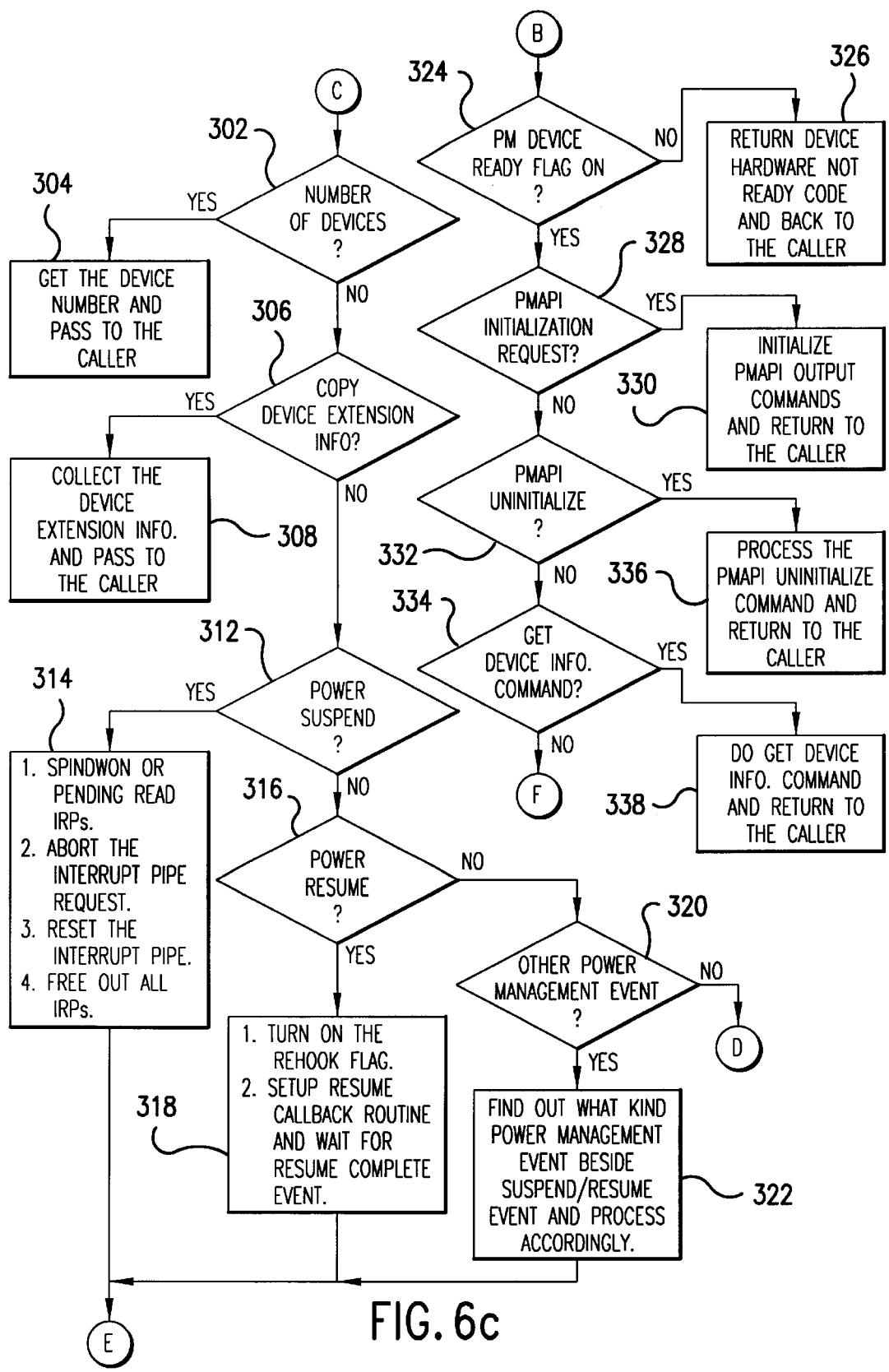
Figure 6D:
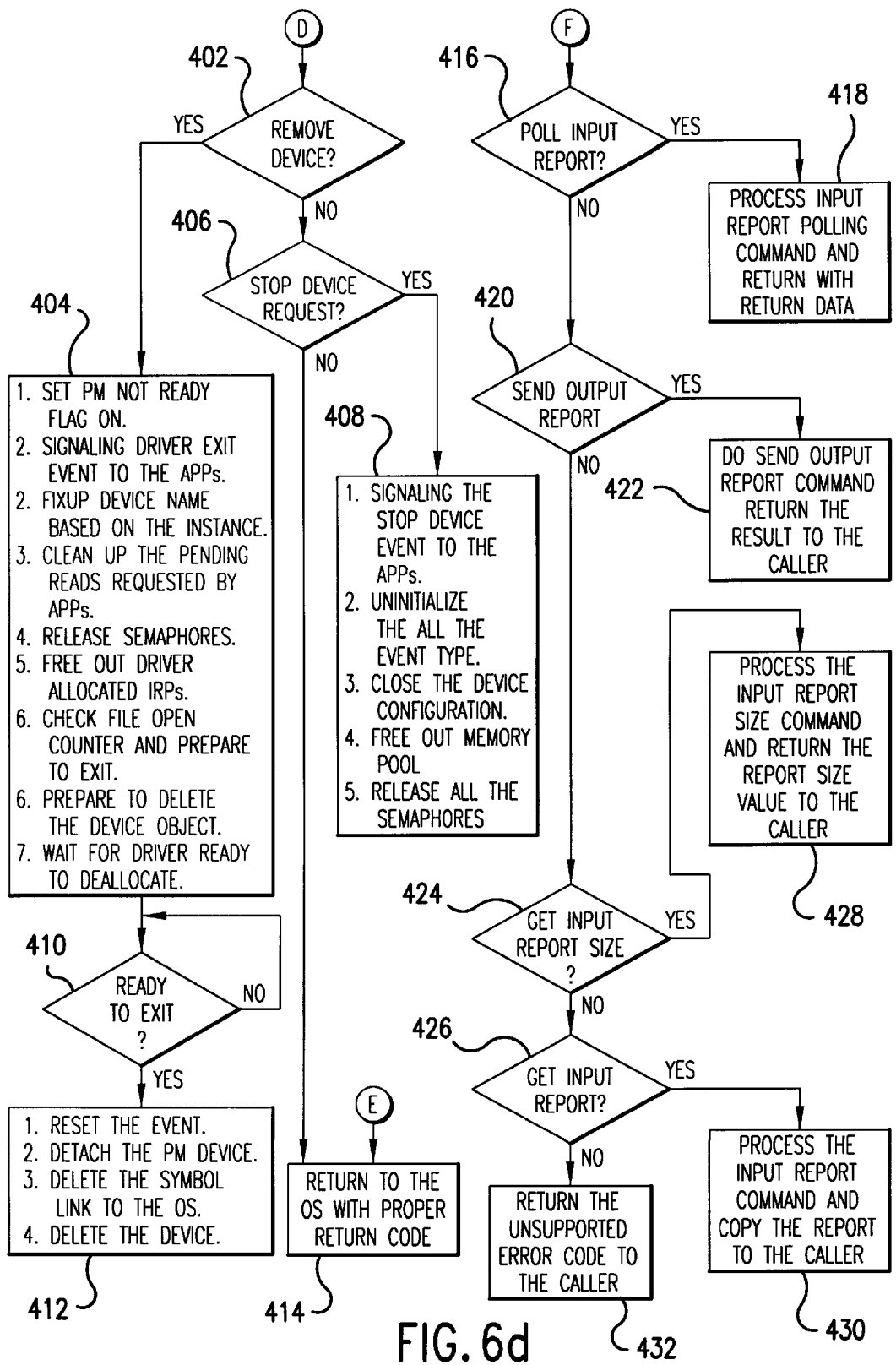
Figure 7:
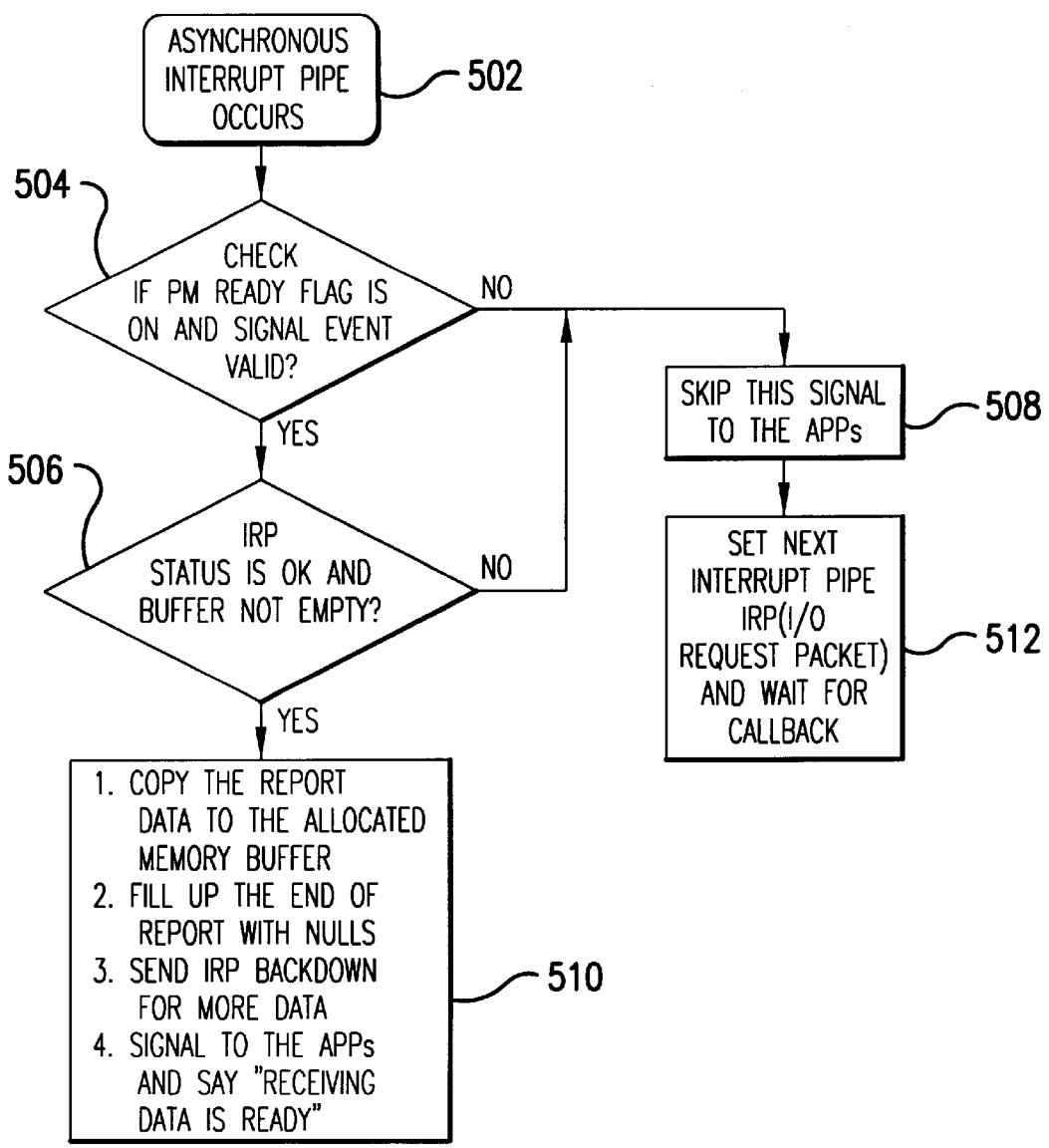
FIG. 7 shows a functional flow diagram of an embodiment of the process for handling an asynchronous interrupt transfer from the USB device at the HID software driver of FIG. 4.

FIGS. 5, 6a through 6d, and FIG. 7 show a flow diagram illustrating the functioning of an embodiment of the Enhan_ HID.SYS module 80 in response to selected events. FIG. 5 illustrates how the Enhan_HID.SYS module 80 executes in response to an attachment of the USB device 16 to the USB. FIG. 7 illustrates the functioning of the Enhan_HID.SYS module 80 in response to a "call back" event at the USBD 78 indicating an Interrupt Transfer. FIG. 6a through 6d illustrates the functioning of the Enhan_HID.SYS module 80 in response to an IRP originating at the applications programs 84 or the operating system. As discussed in greater detail below, these IRPs include requests for, among other things, initializing an attached USB device 16, establishing event handlers associated with the USB device 16 to enable call back events to associated applications, retrieving data representative of Input Reports received from the USB device 16, and sending data representative of Output Reports to the USB device 16.

At FIG. 5, step 101, the USB detects an attachment of the USB device 16 and receives information representative of the Device Descriptor associated with the USB device 16 as discussed above. The received Device Descriptor information may indicate whether the USB device 16 is of the type shown in FIG. 2 without an LCD, or having a control panel such as that shown in FIG. 3 having the LCD display 62. Step 102 checks to determine that the Device Descriptor associated with the attached USB device 16 correspond with a USB device which is supported by the Enhan_HID.SYS module 80. If these modules support the attached device, device driver entry points for the particular attached device are installed at step 104. This creates an instance of the routines in Enhan_HID.SYS module 80 for processing IRPs originating at the operating system or from routines in PMAPI.DLL modules 82, and for handling Interrupt Transfers originating at the USB device 16 directed to the applications programs 84.

Step 104 also initiates an instance of a routine in the Enhan_HID.SYS module 80 for loading and unloading the instance of these routines. Thus, once the instance is created, and hence "loaded" to memory, a routine periodically determines whether the USB device 16 is still in its attached state and whether any applications are supported by the instance. If the USB is no longer attached and no applications are supported by the instance, this routine unloads the instance to free processing resources.

It is understood that immediately following the attachment of the USB device 16 to the USB through the root port 12, any data received from the USB device 16 may be corrupted from noise and transients. At step 105, a Deferred Procedure Call (DPC) timer is initiated which causes a delay for a specified duration (e.g., five seconds) to allow transients and noise at the connection of the USB device 16 to the root port 12 to settle. After this specified delay, processing proceeds to step 106 which includes setting a device ready flag in a memory location to indicate that data in data packets received from the attached USB device 16 in Interrupt Transfers at the USB is reliable, and that the USB may reliably send data to the attached USB device 16 in Control Transfers. This memory location including the device ready flag is preferably write protected at the privilege level of the Enhan_HID.SYS module 80.

FIGS. 6a through 6d show a flow diagram illustrating the functioning of the Enhan_HID.SYS module 80 in processing an IRP initiated by either the operating system or an applications program (via the PMAPI.DLL module 82). At step 110, an IRP from either the operating system or the applications is received. Step 112 determines the current stack location of the IRP, and other information related to, or associated with, the attached device to which the IRP is directed using Microsoft functions provided through the USBDI.

At step 114, the Enhan_HID.SYS module 80 determine whether there are sufficient resources to process the IRP. If there are not sufficient resources to process the IRP, a proper error message is generated and control is returned to the OS at step 116. Step 118 checks to determine whether the IRP is a request to start the device. Either the OS or application may request the Enhan_HID.SYS module 80 to start the device upon detection of the attachment of the USB device 16 to the USB. Thus, at step 120, the Enhan_HID.SYS module 80 obtains the Configuration, Interface, and Endpoint Descriptors. An Interrupt Request Pipe from the USB device to the USB stack is initialized. Also, the DPC timer is initialized to begin a wait sequence which terminates when the PM hardware ready flag is set as discussed above in connection with FIG. 5.

Steps 122, 124, 126, and 128 illustrate a feature which monitors the number of distinct applications which are to be supported by a singular USB device 16 associated with an instance of a device driver of the Enhan_HID.SYS module 80 initiated at step 104. The Enhan_HID.SYS module 80 maintains a counter of the number of distinct applications which are supported by the instance of the device driver. Thus, to obtain support of the instance of the device driver, an application preferably sends an IRP to "open" the device which causes the counter to be incremented at step 124. When an application no longer requires support of the USB device 16, or its associated instance of the driver, the application sends an IRP to "close" the device, thereby decreasing the counter at step 128. As such, the Enhan_HID.SYS module 80 will not unload the drivers for the USB device 16 to free up resources (as discussed above in connection with step 104) until the counter is decremented to zero.

As discussed above, the USB device 16 and its associated instance of the driver may support more than one distinct application. For each of these applications, the Enhan_HID.SYS module 80 preferably maintains an instance of the software driver associated with each of the supported applications. Turning to FIG. 6b, step 206 determines whether the incoming IRP is to create an additional instance of the software driver to support an additional application. If so, step 208 performs the necessary function to determine the pipe attributes, and the interface requirements for the additional instance to be associated with the application to be supported by the additional instance, using, for example, standard Microsoft provided routines.

It is understood that certain applications need to be apprised of certain events occurring at the USB device 16 (such as buttons being pushed, knobs being turned, etc.) and other applications need not be apprised of any events occurring at the USB device 16. For those applications requiring knowledge of such events, such applications may initiate an IRP which is then detected at step 210 to request a single event handler. Upon detection of such request, step 212 determines the type of signaling required to inform the particular application of such events. For example, if the applications are hosted on an operating system which uses a Windows Driver Model (WDM) different from that of the Enhan_HID.SYS module 80, step 212 preferably converts its signaling to the applications to accommodate the WDM-type of the operating system hosting the applications.

At step 214, the Enhan_HID. SYS module 80 responds to IRPs initiated by an applications programming interface (API) function call from routines in the PMAPI.DLL module 82. These are discussed in greater detail with reference to FIG. 6c. Step 216 detects an IRP from the operating system requesting an indication as to the attachment state of the USB device 16 from the USB. Upon such a detection, step 218 determines the proper WDM format of the operating system so that the handler indicating such a detachment event to the operating system is in the proper compatible WDM format.

Step 220 detects an IRP from the operating system requesting particular Device Descriptors. For example, the operating system may be requesting information as to whether the attached USB device 16 is of the type having a control panel 20 as shown in FIG. 2 (without an LCD display 62) or of the type having a control panel 46 as shown in FIG. 3 (with an LCD display 62). Step 222 then calls a lower layer stack in the USBD 78 to retrieve the Device Descriptor.

At FIG. 6c, continuing from point C on FIG. 6b, step 302 responds to a request from the operating system inquiring as to the number of USB devices 16 which are coupled to the root port 12. It is understood that multiple USB devices 16 may be coupled to the root port 12 through an intermediary USB hub and that multiple devices may be using distinct instances of the same driver. Accordingly, such a request initiates step 304 which returns the number of devices supported by the Enhan_HID.SYS module 80 to the caller. Step 306 detects a request from the operating system to collect various device extension information at step 308. This IRP may be issued as a part of a debugging procedure.

Steps 312, 314, 316, 318, 320, and 322 are directed to power management requests. Namely, a "suspend" request detected at step 312 and a "resume" request detected at step 316 initiate similarly described processes in the "Advanced Power Management (APM) Bios Interface Specification Revision 1.2, published by Intel Corporation and Microsoft Corporation (February, 1996) incorporated herein by reference. Thus, a power suspend request detected at step 312 initiates processes set forth in step 314 including a spindown of pending IRPs, an abort of any interrupt pipe requests, a reset of the interrupt pipe, a release of all previous IRPs, and storage of the state of the USB to memory. Detection of a power resume request at step 316 initiates processes set forth in 318 including activating a rehook flag to reinitialize the stack and re-associate any pending IRP, and performing other such resume functions, such as restoring the state of the USB. Other power management events may be detected at step 320 which would initiate certain processes to be carried out in the response to such a request at step 322.

As discussed above, a branch to point B is initiated at step 214 (FIG. 6b) upon detection of an API function request from an application. Step 324 determines whether the device ready flag has been set as discussed above in connection with FIG. 5. If the device ready flag has not been set, step 326 returns a code back to the calling application to indicate that the device is not ready. Steps 328, 330, 332, and 336 relate to establishing a protocol between the calling application and the USB device 16 which is not set forth in the USB Specification. Thus, these steps may support a proprietary interface between the calling applications programs and the USB device 16. Steps 328 and 330 relate to an initialization of that protocol. Thus, this IRP is preferably the first IRP to be called after the IRP which inquires as to whether the device ready flag is set. Conversely, an IRP requesting the processes at 336 to uninitialize the application with the USB device 16 is preferably sent prior to decreasing the device counter at step 128 (FIG. 6a). Step 334 detects a command for obtaining device information at step 338 such as, for example, information indicating as to whether the USB device 16 is of the type shown in FIG. 2 having a control panel 20 with no LCD display, or of the type having a control panel such as that shown in FIG. 3 with an LCD display 62.

It is understood that the USBD 78 may provide a signal to the operating system indicating a detachment of the USB device 16 in response to polling by the operating system. Turning to FIG. 6d, at point D, steps 402, 404, 410 and 412 support requests from the operating system indicating a removal or detachment of the USB device 16. At step 404, the Enhan_HID.SYS module 80 resets the device ready flag which was set when the USB device 16 was attached as discussed above with reference to FIG. 5, signals to the applications associated with instances of the software driver for the USB device 16, checks the "open" counter (maintained as described above with reference to steps 122, 124, 126 and 128) to determine whether the instance of the driver may be unloaded from the system, frees interrupt pipes allocated to the instance of the software driver, releases semaphores associated with the instance of the software driver, terminates pending read requests from the applications programs 84, and prepares to delete the object associated with the USB device 16.

Step 410 illustrates a wait sequence which causes the instance of the software driver associated with the detached USB device 16 to terminate when certain conditions are met. The Enhan_HID.SYS module 80 loops back on iterations of this portion of the Enhan_HID.SYS module 80 to step 410 until the "open" counter is decremented to zero, indicating that all of the applications associated with the instance of the software driver have acknowledge receipt of a notification the detachment of the USB device 16. When the termination condition is met at step 410, step 412 performs various functions to terminate the instance of the software driver associated with the detached device by deleting the symbolic link between the operating system and the USB device 16 and deleting the instance of the software driver.

Step 406 indicates a detection of an IRP from the operating system which is a request to stop the device. This may be initiated by events which include power down, an unplugging of the device, or a user initiated "stop device" event. At step 408, the Enhan_HID.SYS modules 80 signals to the affected applications, uninitializes events associated with the device, closes the device, releases semaphores associated with the device and frees the portion of memory occupied by the instance of the software driver associated with the device.

At point F, steps 416 and 418 support requests from an application to poll the USB device using a Control Transfer. This capability may enable an application to support diagnostic functions. Steps 420 and 422 respond to a request from an application to send an Output Report to the USB device 16 using a Control Transfer as discussed above. Here, referring to the embodiments shown in FIGS. 2 and 3, such Output Reports may include information representative of changes in the status of the controls selectable from selection buttons 26, 27, 20 28, 30, 32, and the message light 34. In the embodiment shown in FIG. 2, these Output Reports may provide inputs to the USB device for changing the status of the LEDs above, and associated with, the selection buttons. In the embodiment shown in FIG. 3, these Output Reports would be used to change the state of the LCD 62.

Steps 424, 426, 428, and 430 correspond to the retrieval of Input Reports. Such Input Reports are preferably part of a data packet which is associated with an Interrupt Transfer which has been written to a buffer location in memory as discussed in greater detail with reference to FIG. 7 below. Embodiments of the control panel of the USB device 16 as shown in FIGS. 2 and 3 include function selection buttons, VCR-like controls, the volume knob 22, and the IRR 24 to receive inputs from the IRC 15. Each of these actuation features on the control panel may correspond with a separate Input Report. Thus, according to an embodiment, multiple user inputs from the USB device 16 may be included in a data packet from a single Interrupt Transfer.

Figure 8:
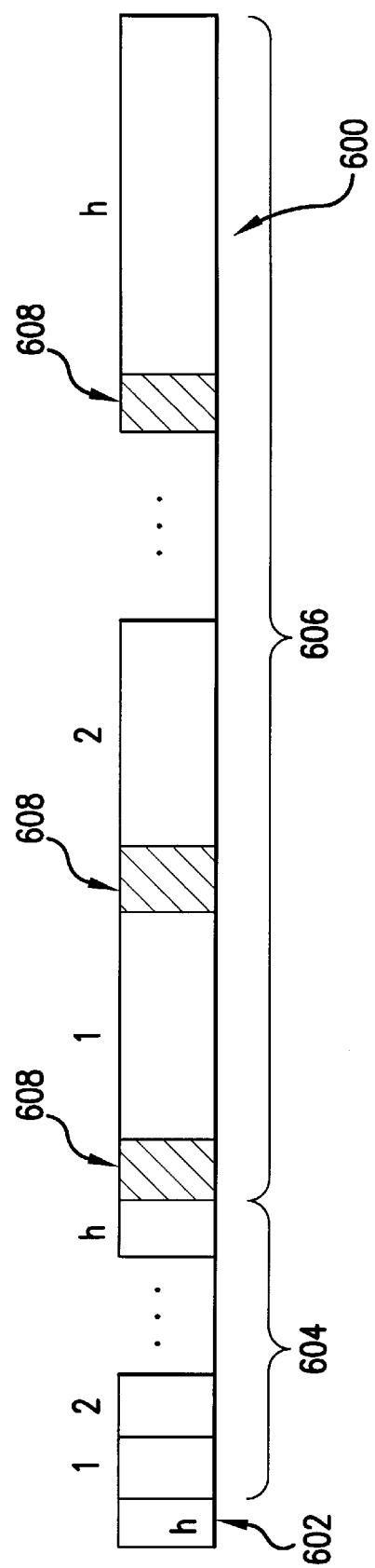
FIG. 8 shows the format of a portion of a data packet associated with in an Interrupt Transfer according to an embodiment.

FIG. 8 shows a portion of the data packet associated with an Interrupt Transfer which includes an n-number of Input Reports. A double word 602 at the leading portion indicates the number of input reports in the interrupt transfer data packet. N-double words follow in data field 604 which identifies the usage or function associated with each of the corresponding Input Reports which follow. Field 606 then includes these n-Input Reports. As discussed in greater detail below with reference to FIG. 7, the receipt of an Interrupt Transfer initiates a call back event directed to the applications via an associated event handler to indicate that an Interrupt Transfer has occurred and that a corresponding data packet has been stored in a buffer portion of memory. In response, the affected applications program preferably calls routines in PMAPI.DLL module 82 to send an IRP to the Enhan_HID.SYS module 80 to retrieve the number of reports in the data packet stored at the double word field 602 (FIG. 8). Then, a routine in the PMAPI.DLL modules 82 initiates another IRP to retrieve data in field 604 indicating the usage or function associated with each of the n-Input Reports in the data packet 600. The PMAPI.DLL module 82 may also initiate other IRPs to determine other structural information representative of the format of the Input Reports in the data packet.

Returning to FIG. 6d, the applications in applications programs 84 corresponding to the functions or usages identified in the data from portion 604 of the received data packet 600 sequentially initiate IRPs to first get the input report size at steps 424 and 428, and then get the report data at steps 426 and 430. Thus, as illustrated in FIG. 8, the field 608 corresponding to the associated Input Report is retrieved in response to a first IRP from the application corresponding to the usage or function of the associated Input Report. After determining the size of the Input Report from the associated double word field 608, the application initiates a second IRP to retrieve the remainder of the report at step 430. Driver run-time process reaches step 432 if the IRP does not correspond to any supported command. As such, a proper error code is generated.

FIG. 7 is a flow diagram illustrating the processing of the Enhan_HID.SYS module 80 in response to the receipt of an Interrupt Transfer. At step 502, the Enhan_HID.SYS module 80 receives a call back from the USBD 78 indicating the receipt of an Interrupt Transfer. At step 504, the process checks to see if the device ready flag is set as discussed above in connection with FIG. 5. At step 506, the process determines whether there are sufficient memory resources to receive the data packet associated with the Interrupt Transfer. If the device ready flag is set and there are sufficient resources to receive the data packet associated with the Interrupt Transfer, the process at step 510 copies the portion of the data packet including the Input Reports to an allocated buffer location, fills the end of the report portion with zeros to fill the remainder of the allocated portion, and signals to the applications that an Interrupt Transfer has been received and that an associated data packet including Input Reports has been stored in the memory buffer. In response to this signal to the applications, as discussed above, the applications may initiate IRPs to obtain the number of Input Reports in the stored data packet, the usages/functions associated with each of the Input Reports, and other format information. If step 504 determines that the device ready flag is not set, or if step 506 determines that there are not sufficient resources to receive the data packet associated with the Interrupt Transfer, step 508 bypasses the signal to the applications and step 512 sets the next interrupt IRP and puts the Enhan_HID.SYS 80 in a state of waiting for another call back event.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a computer system including a host having a processor, a Universal Serial Bus (USB) host controller and a port for attaching to a USB device, the USB host controller being capable of coupling to the USB device through an attachment to the port, the USB host controller including circuitry for detecting an attachment of the USB device to the port for enabling a bidirectional communication channel between the host unit and the USB device, the improvement comprising:

logic for detecting a condition indicative of a degree of reliability of the bi-directional communication channel upon attachment of USB device to the at least one port; and logic for enabling at least one of transmission of a Control Transfer from the host to the attached USB device and receipt of data provided by the attached USB device to the host in an Interrupt Transfer upon detecting the condition indicative of a degree of reliability in the bi-directional communication channel enabled by the attachment of the USB device.

2. The computer system of claim 1, wherein the enabling logic enables the at least one of transmission of a Control Transfer from the host to the attached USB device and receipt of data provided by the attached USB device to the host in an Interrupt Transfer following a set time period following a detection of an attachment of the USB device to the USB controller.

3. The computer system of claim 1, wherein the enabling logic inhibits the transmission of a Control Transfer from the host to the attached USB device and the receipt of data provided by the attached USB device to the host in an Interrupt Transfer until the detection of the condition indicative of a degree of reliability in a bi-directional communication channel enabled by the attachment of the USB device.

4. In a computer system including a host having a processor, a Universal Serial Bus (USB) host controller and a port for attaching to a USB device, the processor executing at least one applications program and one or more instances of a software driver, the software driver being capable of supporting communication between an attached USB device and the host, the USB host controller being capable of coupling to the USB device through an attachment to the port, the USB host controller including circuitry for detecting an attachment of the USB device to the port or a detachment of the USB device from the port, the improvement comprising:

logic for associating an attachment of the USB device with an instance of the software driver;

logic for associating the instance of the software driver with at least one application program executing on the processor, the instance of the software driver being responsive to calls from the at least one associated application program;

logic for maintaining the instance of the software driver while the at least one application is executing, independent of whether the USB device remains attached to the port; and logic for terminating the instance of the software driver in response to one of a termination of the execution of the at least one application program and an acknowledgment that the application program has been notified of a detachment of the USB device.

5. The computer system of claim 4, the improvement further including:

logic for maintaining a count of the executing application programs which are associated with the instance of the software driver and decrementing the count when one of the execution of an associated application terminates and an acknowledgment that the associated application has been notified of a detachment of the USB device; and logic for terminating the instance of the software driver when the count is decremented to zero.

6. The computer system of claim 4, the host further including a portion of memory which is allocated to the instance of the software driver, wherein the improvement further includes logic for de-allocating the memory allocated to the instance of the software driver when the instance of the software driver terminates.

7. A host computer system having a Universal Serial Bus (USB) host controller capable of attaching to a USB device through a port, the USB device having a plurality of distinct controls for receiving user inputs, the host computer system comprising:

logic for associating the USB device with exactly one Entity Descriptor which defines a plurality of data structures, each data structure being associated with one of the distinct controls;

a memory for storing a data packet received in response to an associated Interrupt Transfer initiated at the USB device, the data packet including data representative of a plurality of said data structures, each of the plurality of data structures including data representative of user inputs from its associated control; and logic for extracting each of the plurality of data structures from the stored data packet.

8. The host computer system of claim 7, the host computer system further including:

a processor for executing application programs thereon;

logic for associating each of the reports extracted from the stored data packet with an application program; and logic for notifying each application program associated with an extracted data structure of the receipt of said extracted data structure.

9. The host computer system of claim 7, wherein the logic for extracting data structures from the stored data packet includes:

logic for determine the number of data structures included in the stored data packet;

logic for associating each of the data structures in the stored data packet with one of the controls of the USB device;

logic for determining a memory location of each data structure in the stored data packet; and logic for retrieving each data structure in the stored data packet at its associated memory location by executing an application program associated with the data structure.

10. A host computer system having a Universal Serial Bus (USB) controller capable of attaching to a USB device through a port to receive Interrupt Transfers, the Interrupt Transfers having a data packet associated therewith, the host computer system comprising:

logic for enabling the receipt of Interrupt Transfers from the USB device at the USB controller in response to an attachment of the USB device to the USB controller;

circuitry for detecting an Interrupt Transfer at the port; and logic for selectively storing the data packet of the detected interrupt transfer in an allocatable memory when at least one of the host computer system is enabled to receive Interrupt Transfers and sufficient memory at the host computer system is allocatable to store the data packet.

11. The host computer system of claim 10, wherein the logic for enabling the receipt of Interrupt Transfers further includes:

logic for associating the attached USB device with an instance of a software driver;

logic for detecting of a condition indicative of a degree of reliability of data received from Interrupt Transfers initiated at the attached USB device.

12. The host computer system of claim 11, wherein the logic detecting a degree of reliability of the data received from Interrupt Transfers initiated at the attached USB device detects a passage of a set time period following a detection of an attachment of the USB device to the USB controller.

13. The host computer system of claim 10, the host computer system further comprising logic for transmitting an error signal to the attached USB device upon detection of an Interrupt Transfer when the host computer system is not enabled to receive the Interrupt Transfer or there is not sufficient memory allocatable to store the associated data packet.

14. A computer readable medium for use in conjunction with a computer system including a host having a processor and a Universal Serial Bus (USB) host controller, the USB host controller being capable of attaching to at least one USB device through at least one port, the computer readable medium including computer readable instructions encoded thereon for:

detecting an attachment of a USB device to the at least one port; and enabling at least one of transmission of a Control Transfer from the host to the attached USB device and receipt of data provided by the attached USB device to the host in an Interrupt Transfer upon detection of a condition indicative of a degree of reliability in a bi-directional communication channel enabled by the attachment of the USB device.

15. The computer readable medium of claim 14, the computer readable medium further including computer readable instructions encoded thereon for enabling the at least one of transmission of a Control Transfer from the host to the attached USB device and receipt of data provided by the attached USB device to the host in an Interrupt Transfer following a set time period following a detection of an attachment of the USB device to the USB controller.

16. The computer readable medium of claim 14, the computer readable medium further including computer readable instructions encoded thereon for inhibiting the transmission of a Control Transfer from the host to the attached USB device and the receipt of data provided by the attached USB device to the host in an Interrupt Transfer until the detection of the condition indicative of the degree of reliability.

17. A computer readable medium for use in conjunction with a computer system including a host having a processor and a Universal Serial Bus (USB) host controller, the USB host controller being capable of attaching to at least one USB device through at least one port, the computer readable medium including computer readable instructions encoded thereon for:

associating an attached USB device with an instance of a software driver executable on the processor, the software driver being capable of supporting communication between the attached USB device and the host;

associating the instance of the software driver with at least one application program executing on the processor, the instance of the software driver being responsive to calls from the at least one associated application program;

maintaining the instance of the software driver while the at least one application is executing, independent of whether the USB device remains attached to the USB; and terminating the instance of the software driver in response to one of a termination of the execution of the at least one application program and an acknowledgment that the application program has been notified of a detachment of the USB device.

18. The computer readable medium of claim 17, the computer readable medium further including computer readable instructions encoded thereon for:

maintaining a count of the executing application programs which are associated with the instance of the software driver and decrementing the count when one of the execution of an associated application terminates and an acknowledgment that the associated application has been notified of a detachment of the USB device; and terminating the instance of the software driver when the count is decremented to zero.

19. The computer readable medium of claim 17, wherein the host further includes a portion of memory which is allocated to the instance of the software driver, wherein the computer readable medium further includes computer readable instructions encoded thereon for de-allocating the memory allocated to the instance of the software driver when the instance of the software driver terminates.

20. A computer readable medium for use in conjunction with a host computer system having a Universal Serial Bus (USB) host controller capable of attaching to a USB device through a port, the USB device having a plurality of distinct controls for receiving user inputs, the computer readable medium including computer readable instructions encoded thereon for:

associating the USB device with exactly one Entity Descriptor which defines a plurality of data structures, each data structure being associated with one of the distinct controls;

storing in a memory associated with the host computer system a data packet received in response to an associated Interrupt Transfer initiated at the USB device, the data packet including data representative of a plurality of said data structures, each of the plurality of data structures including data representative of user inputs from its associated control; and extracting each of the plurality of data structures from the stored data packet.

21. The computer readable medium of claim 20, wherein the host computer system further includes a processor for executing application programs thereon, and wherein the computer readable medium further includes computer readable instructions encoded thereon for: associating each of the reports extracted from the stored data packet with an application program; and notifying each application program associated with an extracted data structure of the receipt of said extracted data structure.

22. The computer readable medium of claim 20, the computer readable medium further including computer readable instructions encoded thereon for:

determining a number of data structures included in the stored data packet;

associating each of the data structures in the stored data packet with one of the controls of the USB device;

determining a memory location of each data structure in the stored data packet; and retrieving each data structure in the stored data packet at its associated memory location by executing an application program associated with the data structure.

23. A computer readable medium for use in conjunction with a host computer system having a Universal Serial Bus (USB) controller capable of attaching to a USB device through a port to receive Interrupt Transfers, the Interrupt Transfers having a data packet associated therewith, the computer readable medium including computer readable instructions encoded thereon for:

enabling the receipt of Interrupt Transfers from the USB device at the USB controller in response to an attachment of the USB device to the USB controller;

detecting an Interrupt Transfer at the port; and selectively storing the data packet of the detected interrupt transfer in an allocatable memory when at least one of the host computer system is enabled to receive Interrupt Transfers and sufficient memory at the host computer system is allocatable to store the data packet.

24. The computer readable medium of claim 23, the computer readable medium further including computer readable instructions encoded thereon for:

associating the attached USB device with an instance of a software driver; and detecting a condition indicative of a degree of reliability of data received from Interrupt Transfers initiated at the attached USB device.

25. The computer readable medium of claim 24, the computer readable medium further including computer readable instructions encoded thereon for detecting a passage of a set time period following a detection of an attachment of the USB device to the USB controller to determine a degree of reliability of the data received from Interrupt Transfers initiated at the attached USB device detects.

26. The computer readable medium of claim 23, the computer readable medium further including computer readable instructions encoded thereon for transmitting an error signal to the attached USB device upon detection of an Interrupt Transfer when the host computer system is not enabled to receive the Interrupt Transfer or there is not sufficient memory allocatable to store the associated data packet.

* * * * *